(12) United States Patent
Zhang et al.

(10) Patent No.: US 7,600,468 B2
(45) Date of Patent: Oct. 13, 2009

(54) RELAY SWITCH FOR TOASTER

(76) Inventors: George Mohan Zhang, Block 9, Tongfuyu Industrial Zone, Tanglang, Xili, Nanshan, Shenzhen (CN); Huajin Chen, Block 9, Tongfuyu Industrial Zone, Tanglang, Xili, Nanshan, Shenzhen (CN)

(*) Notice: Subject to any disclaimer, the term of this patent is extended or adjusted under 35 U.S.C. 154(b) by 656 days.

(21) Appl. No.: 11/368,264

(22) Filed: Mar. 2, 2006

(65) Prior Publication Data
US 2006/0207437 A1    Sep. 21, 2006

(30) Foreign Application Priority Data
Mar. 2, 2005 (CN) .................... 2005 2 0055416 U
Aug. 8, 2005 (CN) .................... 2005 2 0062858 U

(51) Int. Cl.
*A47J 37/08* (2006.01)

(52) U.S. Cl. .................... 99/327; 99/329 P; 99/329 RT; 99/332; 99/385; 99/389; 219/392; 219/413; 219/493; 219/521; 219/491

(58) Field of Classification Search .................... 99/327, 99/329 P, 329 RT, 385, 389, 391; 219/521, 219/524, 492, 494, 497, 518, 525, 392, 413, 219/514, 491, 493; 392/373, 374, 375, 337, 392/407
See application file for complete search history.

(56) References Cited

U.S. PATENT DOCUMENTS

| 3,614,671 | A  | * | 10/1971 | Steinback | .................... 333/105 |
| 6,230,611 | B1 | * | 5/2001  | Mauffrey  | ...................... 99/327  |
| 6,350,970 | B1 | * | 2/2002  | Huggler   | ...................... 219/514 |
| 6,380,520 | B1 | * | 4/2002  | Nguyen    | ...................... 219/392 |
| 6,481,341 | B1 | * | 11/2002 | Choi      | .......................... 99/327 |

* cited by examiner

*Primary Examiner*—Reginald L Alexander
(74) *Attorney, Agent, or Firm*—Raymond Y. Chan; David and Raymond Patent Firm

(57) ABSTRACT

The present invention discloses a relay switch arrangement for a toaster, the arrangement has an actuating member releasably engaged to the engaging metal positioned above the electromagnet, and shifted between a power-on position and a power-off default position. A homing spring is provided biasing against the actuating member for maintaining the actuating member in the power-off position. Electrical contacts are respectively provided onto a pair of power slabs for selectively completing the circuit, wherein in the power-on position, the actuating member drives two contacts approach with each other complete the circuit to charge the electromagnet attracting the engaging metal, in the power-off default position, the circuit is powered off enabling the electromagnet to release the engaging metal, the homing spring will upwardly push the actuating member thus driving the engaging metal tilt up so as to disengage the pair of contacts for security purposes.

20 Claims, 14 Drawing Sheets

RELAY SWITCH FOR TOASTER

BACKGROUND OF THE PRESENT INVENTION

1. Field of Invention

The present invention relates to electrical heating devices, and more particularly, relates to a kind of relay switch used for toaster.

2. Description of Related Arts

For lots of people, the toaster is a daily part of breakfast. Commonly, an electrical toaster comprises an outer casing, a handle, a base, an electrical timer, and a PCB module. The basic idea behind the toaster is simple. A toaster uses infrared radiation to heat a piece of bread. When a user put a piece of bread in and sees the coils glow red, the coils would produce infrared radiation to dry and char the surface of the bread. The timer is adapted to set a toasting time, turn the toaster off automatically after the preset time runs up and at the same time releases the tray so that toasted bread pops up. Accordingly, a user is able to freely and selectively set the toasting time according to his preference of toast darkness.

Ordinarily, an electrical toaster is operated in the following procedure. Above all, a user would ensure the toaster is electrically powered; afterwards, he or she would insert the bread into the bread compartment of the toaster, such that the bread could be supported by a toasting tray and a sliding rack which is coupled to the handle of the toaster. After then, the user would set a desirable toasting time by adjusting the timer. By depressing down the handle, the sliding rack and toasting tray would be lowered into the bread compartment, and simultaneously, the lowered toasting tray would press against the contact enabling the switch to be electrically powered to charge the electromagnet of the timer thus attracting the engaging metal (commonly a piece of metal) in position. During such position, the switch is maintained at a power-on status, the handle, the sliding rack and the toasting tray is kept at the same position. As a result, the coils would be enabled to heat and toast the bread. Whenever the toasting time reach the preset toasting time in practice, the electromagnet of the timer would be powered off for releasing the engaging metal. As a result, the spring-loaded toasting tray coupled to the engaging metal would be pop up to resume a default upper position.

However, occasionally due to some accidental factors, the automatic urging mechanism of the toasting tray might fail to rebound in practice. For example, the sliding rack and the toasting tray could have been stuck within the casing and failed to pop up. The consequences of such failure would be devastating. This is due to the fact that the switch of the power source could not be severed off; the coils would be powered for an extended period of time thus singing the bread as well as resulting accidents and personal harms. This overtime toasting would cause over-baked bread useless, even bring serious damage to components of the electrical toaster allowing users in a dangerous position.

Additionally, the electromagnet and the engaging metal are exposed without any protection arrangement. Meanwhile, the contact of power source would generate sparks as well as electric arc in practice, which would be considered as potential danger. Finally, the crumb as well as dust would contaminate the electrical switch thus invalidating the performance of the electromagnet and the engaging metal.

SUMMARY OF THE PRESENT INVENTION

A primary object of the present invention is to provide a toaster relay switch for solving the above mentioned drawbacks of conventional toaster, wherein electrical power could be successfully severed off after the preset time runs off no matter whether the electromagnet and engaging magnet pop up or not.

Another object of the present invention is to provide a toaster relay switch, wherein the electromagnet and engaging magnet could be protected for preventing any undesirable dusts and crumb contaminating the toasting tray popping up mechanism.

Another object of the present invention is to provide a toaster relay switch, wherein no complicated structure and expensive parts would be required for achieving the above mentioned objects.

Accordingly, to achieve the above mentioned objects, the present invention provides a toaster, comprising:

a toasting housing;

a toasting compartment received within the toasting housing, having at least a heating coil for heating purpose;

a toasting tray provided within the toasting compartment;

an electrical timer for setting a toasting time;

a handle provided onto the toasting housing for shifting the toasting tray between a power-on toasting position and a power-off default position; and a relay switch arrangement, comprising:

a switch casing having a top stand;

an electromagnet assembly supported within the switch casing, comprising an electromagnet, and an engaging metal having a fixing end supported onto the switch casing and a free end detachably engaged with the electromagnet at a position above the electromagnet;

an actuating member, having a securing end hinged onto the top stand, and an engaging end rotatably coupled to the free end of the engaging metal;

a power on/off arrangement, having a power slab securely mounted onto the switch casing and electrically connected to a power source, and a switch leaf electrically connected to the electromagnet and moveably supported within the switch casing;

wherein in the power-on toasting position, the lowered toasting tray press the actuating member so as to drive the switch leaf approach towards the power slab until the contacts respectively disposed onto the switch leaf and power slab engaged to complete the PCB circuit to toast the bread and meanwhile to charge the electromagnet attracting the engaging metal in position, such that the attracted engaging metal will tightly maintain the switch leaf contact with the power slab within sustained manner;

wherein in the power-off default position, the PCB circuit is powered off enabling the electromagnet to release the engaging metal, the actuating member will drive the engaging metal tilt up so as to disengage the contacts respectively provided onto the engaging leaf and power slab in practice.

Furthermore, the actuating member is inverted T shaped or inverted L shaped in practice.

Furthermore, the engaging end is defined as an engaging metal holder having a fixing end coupled to the actuating member, and an engaging end rotatably coupled to the free end of the engaging metal, wherein the engaging metal holder is adapted to slide through the toasting housing via a guiding channel.

Furthermore, the toasting housing further comprises a base provided within the toasting housing at a lower position for supporting an engaging metal bracket at left, a supporting terrace disposed at a middle position for supporting the electromagnet, and a spacing channel disposed at a right position for correspondingly mating with the guiding channel.

Furthermore, the electromagnet has an E-shaped groove for fittingly accommodating the engaging metal in position.

Furthermore, the engaging metal holder has a pressing pin for mounting a first contact, while a second contact is provided at the power slab at a position correspondingly mated with the pressing pin of the switch leaf, wherein the power slab is L shaped defined in practice.

Furthermore, the relay switch arrangement further comprises a reset mechanism having at least a homing spring disposed beneath the cross bar of the actuating member and aligned with the guiding channel define onto the switch casing.

Or otherwise, both of the switch leaf and the power slab are inverted L shaped for aligning the contacts respectively defined thereon, wherein two contacts are spacedly parallel with each other and fixed onto the right wall of the switch casing.

Or otherwise, the switch leaf is L shaped, while the power slab is elongated shaped, wherein one of the L-shaped switch leaf is parallel with respect to the power slab and mounted onto the right wall of the toasting housing. The other end of the L-shaped switch leaf is correspondingly aligned with the contact of the power slab at an elevated position, wherein a middle portion of the L-shaped switch leaf is positioned adjacent to the furcated pressing pin downwardly extended from the engaging metal holder.

Or otherwise, both of the switch leaf and the power slab are elongated shaped in practice, wherein contacts respectively defined thereon are correspondingly aligned at a vertically spaced position, the switch leaf is disposed below the engaging metal holder, such that the pressing pin downwardly extended from the engaging metal holder is capable of selectively engaging with the switch leaf for power on/off management.

According to the present invention, the power would be effectively turned off regardless of position of the sliding rack and the supporting tray. And more importantly, the electromagnet, the engaging metal, and the power switch are enclosed with the toasting housing for preventing any undesirable dust, crumbs contaminated the device so as to prolong the life span of the toaster.

These and other objectives, features, and advantages of the present invention will become apparent from the following detailed description, the accompanying drawings, and the appended claims.

DETAILED DESCRIPTION OF THE PREFERRED EMBODIMENT

Figure 1:
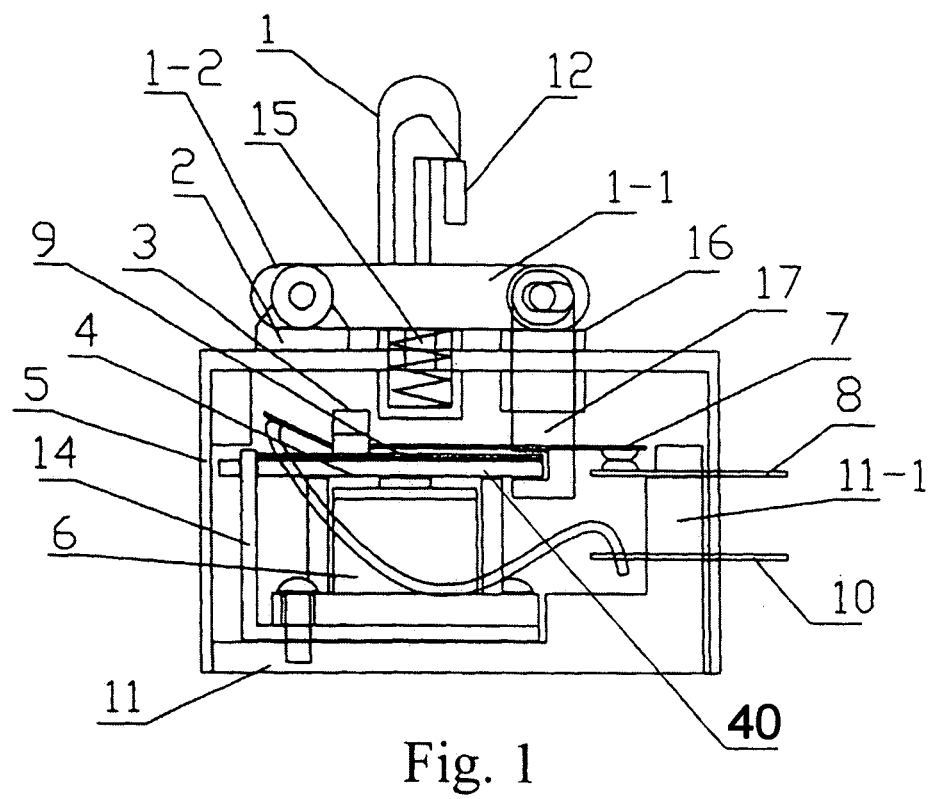
FIG. 1 is a sectional view of the toaster relay switch according to a preferred embodiment of the present invention.
Figure 2:
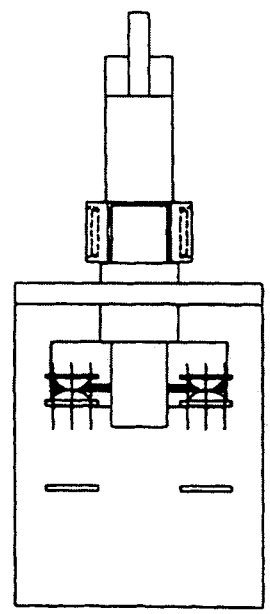
FIG. 2 is a right view of the toaster relay switch according to above mentioned embodiment.
Figure 3:
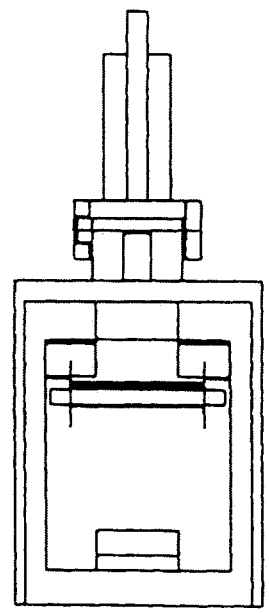
FIG. 3 is a left view of the toaster relay switch according to above mentioned embodiment.
Figure 4:
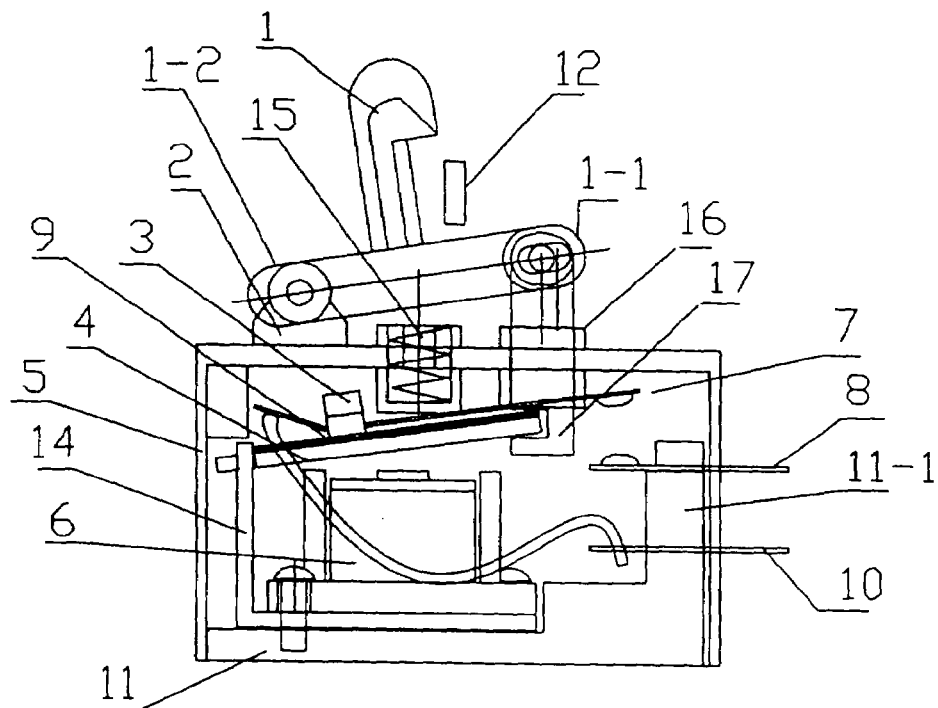
FIG. 4 is a schematic view of the toaster relay switch according to the preferred embodiment of the present invention.

Referring to FIG. 1 to FIG. 6, the toaster relay switch according to a preferred embodiment of the present invention is illustrated. First of all, a user should insert the bread into the toasting compartment and dispose the bread onto the toasting tray. Afterwards, he or she would depress the handle to lower the sliding rack as well as the toasting tray. At the same time, the handle hook 12 provided at the sliding rack will be lowered until the handle hook 12 engaged with one end of an inverted T shaped latch as shown in FIG. 4.

Figure 5:
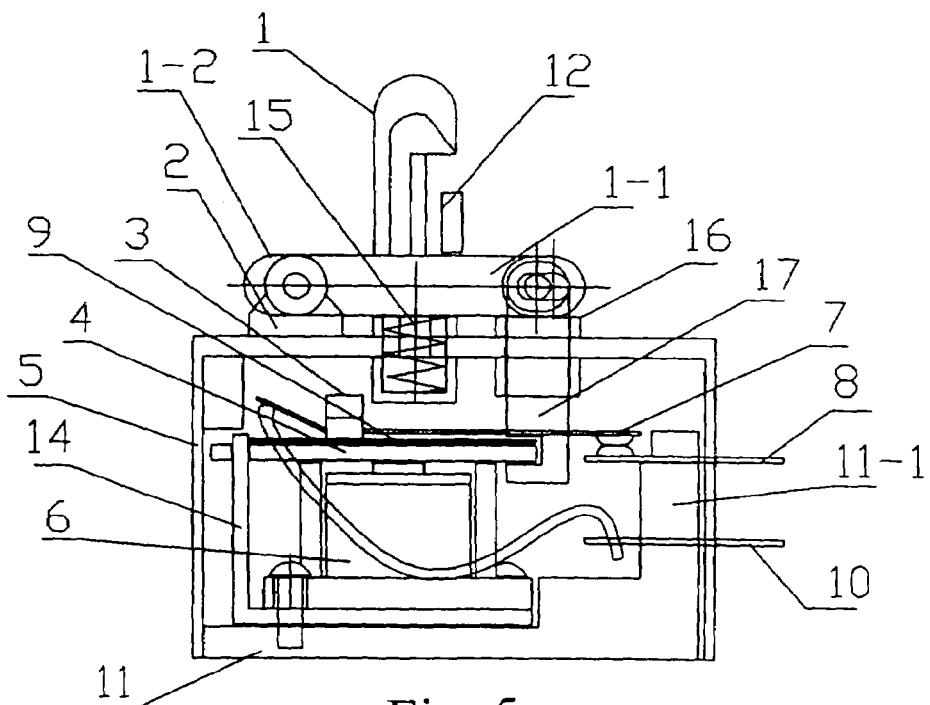
FIG. 5 is another schematic view of the toaster relay switch according to the preferred embodiment of the present invention.

Therefore, the inverted T shaped latch 1 will be urged to be clockwise rotated with respect to the post 2 on which another end of the inverted T shaped hook is hinged. On the other hand, the engaging metal holder 17 is rotatably coupled to the end 1-2 of the inverted T shaped latch, the clockwise pivoting movement of the inverted T shaped latch 1 would drive the engaging metal holder 17 inwardly sliding along a guiding slot 16 of the casing 5, as a result, the engaging metal holder 17 will press the free end of the engaging metal approaching towards the electromagnet 6. In the meanwhile, the switch leaf 7 provided at the engaging metal 4 will downwardly move as well to approach the power leaf 8. After the contact provided at the switch leaf touch the contact of the power leaf, the PCB controlled timer will be enabled to charge the electromagnet to attract the engaging magnet thus ensuring two contacts respectively provide at the switch leaf and power leaf tightly engaged. As a result, the toasting coil and PCB circuit will be continuously powered to toast the bread received within the toasting compartment as shown in FIG. 5.

Figure 6:
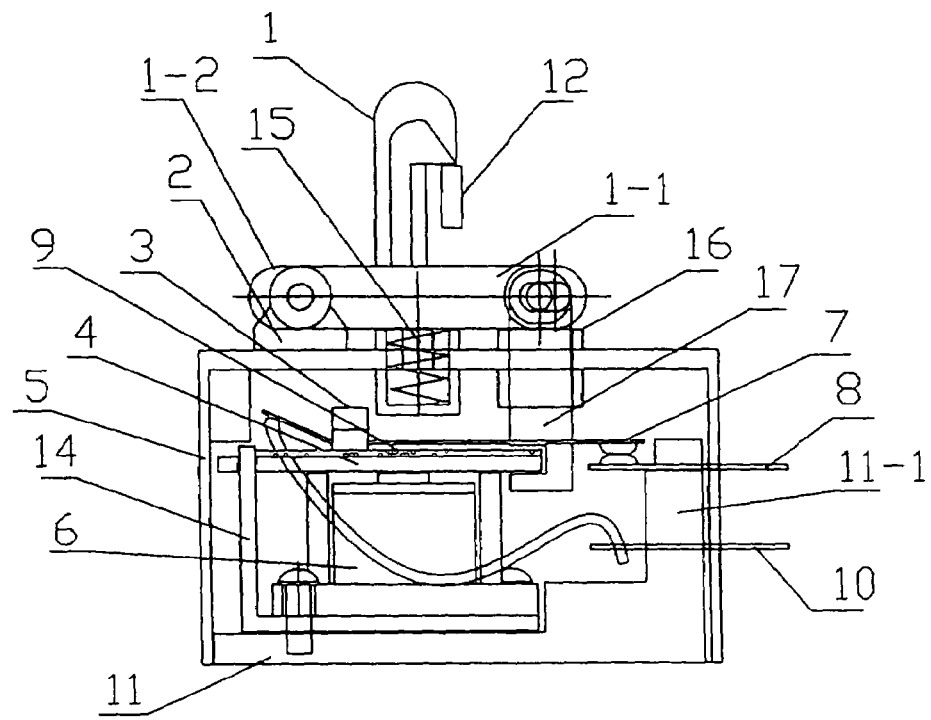
FIG. 6 is another schematic view of the toaster relay switch according to the preferred embodiment of the present invention.

Whenever the user release the handle of the toaster, the spring-loaded sliding rack will be automatically popped up thus enabling the hooking member attached onto the sliding rack popped up as well. Since the engaging metal is attracted onto the electromagnet, the hooking member 12 will be hitched by the inverted T shaped latch 1 as shown in FIG. 6. When toasting time reach the preset time of the electrical timer, the PCB will power off the electromagnet 6 to release the engaging metal 4. The free end engaging metal will be lifted up by the upwardly shifted inverted T shape latch loaded by homing spring 15. As a result, the free end of the engaging magnet will be tilted up to disengage with the electromagnet 6. That is to say, the switch contact provided at the engaging metal will be disengaged with the power contact as well. The PCB controlled circuit 40 and heating coil will be electrically powered off as shown in FIG. 4. The hooking member 12 will be upwardly pushed to disengage the inverted T shape latch. It is seen that the position of the sliding rack and toasting tray will not affect the power supply status of the toaster.

In other words, the present invention provides a toaster, comprising a toasting housing, a toasting compartment received within the toasting housing, wherein at least a heating coil is disposed within the toasting housing for heating the bread therein. Accordingly, there is at least a spring loaded toasting tray provided within the toasting compartment as well for supporting the bread and an electrical timer for setting a toasting time. Furthermore, the toaster comprises a handle provided onto the toasting housing for shifting the toasting tray between a power-on toasting position and a power-off default position, wherein when the handle is depressed by a user, the toasting tray will be lowered to initiate the electrical timer to toast the bread, and when the preset time runs up, the spring loaded toasting tray will be popped up for delivering the bread.

What is more, the toaster of the present invention comprises a relay switch arrangement, comprising a switch casing 5 having a top stand 2, and an electromagnet assembly supported within the switch casing 5, wherein the electromagnet assembly comprises an electromagnet 6, and an engaging metal 4 having a fixing end supported onto the switch casing 5 and a free end detachably engaged with the electromagnet 6 at a position above the electromagnet.

The relay switch arrangement further comprises an actuating member 1, having a securing end 1-2 hinged onto the top stand 2, and an engaging end 1-1 rotatably coupled to the free end of the engaging metal 4, and a power on/off arrangement, having a power slab securely mounted onto the switch casing 5 and electrically connected to a power source, and a switch leaf electrically connected to the electromagnet and moveably supported within the switch casing 5.

wherein in the power-on toasting position, the lowered toasting tray press the actuating member so as to drive the switch leaf approach towards the power slab until the contacts respectively disposed onto the switch leaf and power slab engaged to complete the PCB circuit to toast the bread and meanwhile to charge the electromagnet attracting the engaging metal in position, such that the attracted engaging metal will tightly maintain the switch leaf contact with the power slab within sustained manner;

wherein in the power-off default position, the PCB circuit is powered off enabling the electromagnet to release the engaging metal, the actuating member will drive the engaging metal tilt up so as to disengage the contacts respectively provided onto the engaging leaf and power slab in practice.

Figure 7:
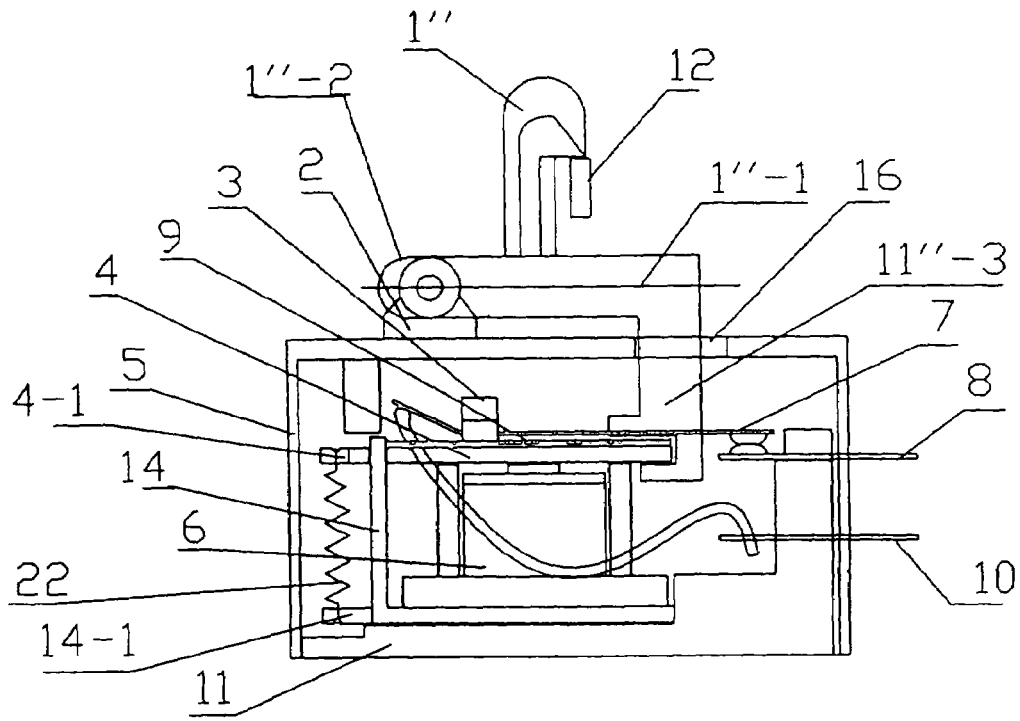
FIG. 7 is a sectional view of the toaster relay switch according to a second embodiment of the present invention.
Figure 8:
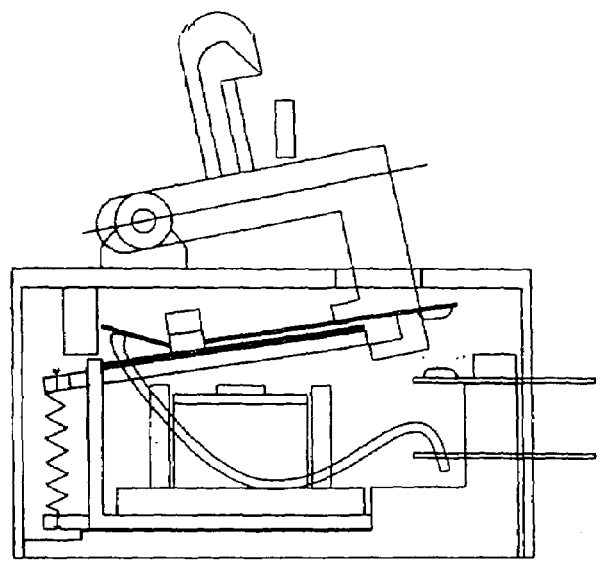
FIG. 8 is a schematic view of the toaster switch according to above embodiment of FIG. 7.

As shown in FIG. 7, another type of inverted T shape latch is illustrated. The inverted T shape latch 1″ has a pivoting end 1″-2 hinged onto the supporting stand 2 of the toaster casing 5, and another end integrally combined with the engaging metal holder 1″-3. The other end of the engaging metal holder 1″-3 is arranged to slide through the toaster casing 5 via a guiding slot 15 and to rotatably coupled with a free end of the engaging metal 4. The engaging metal 4 further comprises a tension spring 22 provided a fixing end of the engaging metal 4, wherein the tension spring 22 has a lower end secured onto the engaging metal bracket 14 and an upper end secured onto the fixing end of the engaging metal 4. It is noted that there are two side projector 14-1, 14-2 laterally extended from the engaging metal bracket and engaging metal to attach the tension spring therebetween.

Figure 9:
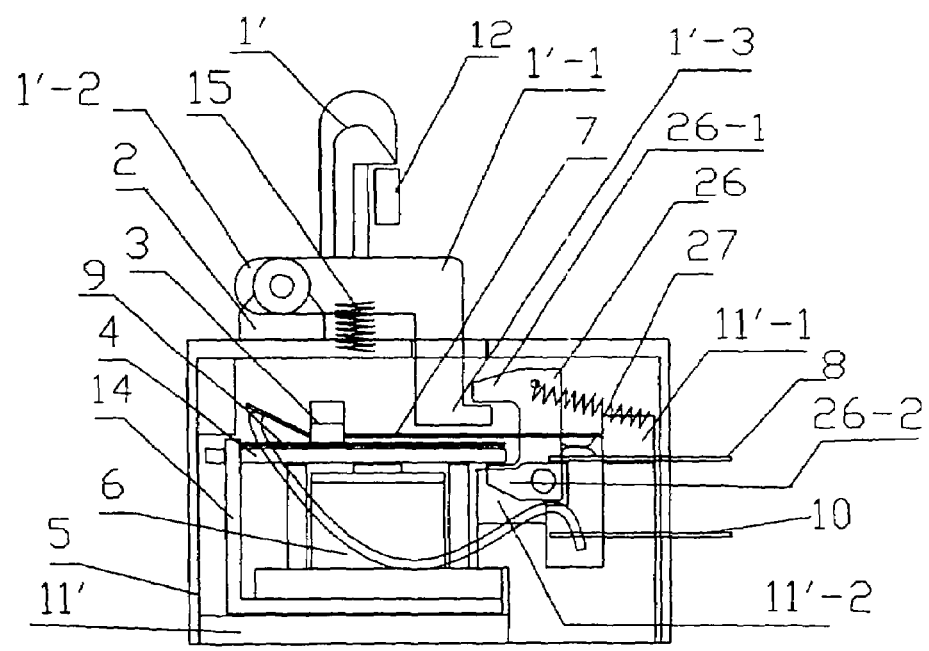
FIG. 9 is a schematic view of the toaster relay switch according to above embodiment of FIG. 7.

Referring to FIG. 9, the toaster under a power-on circumstance according to a second embodiment of the present invention is illustrated. The hooking assembly comprises relay casing 5, a supporting stand 2 provided at the top portion of the relay casing 5, an inverted T shape latch having a horizontal end hinged onto the supporting stand 2, and another end integrally combined with an engaging metal holder 1′-3. A U shape positioning element 26 is provided for maneuvering the engagement between the electromagnet and the engaging metal. The U shaped positioning element 26 has a lower leg 26-2 hinged onto the base stand 11-2, and an upper leg positioned above the lower projector of the hook member, wherein the lower leg is positioned below the free end of the engaging metal 4. furthermore, the U shaped positioning element 26 is provided with a homing spring 27, which is mounted between the upper leg 26-1 and supporting lug 11-1.

Figure 10:
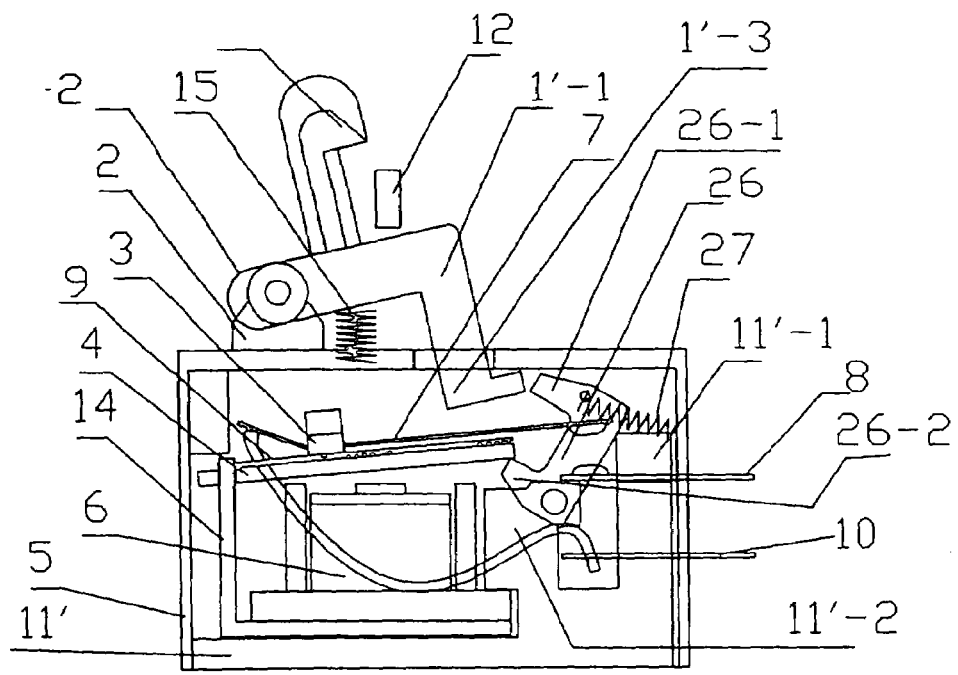
FIG. 10 is a schematic view of the toaster relay switch showing the roaster is rested at a default position.

Referring to FIG. 10, the toaster under a power-off condition according to a second embodiment of the present invention is illustrated. Whenever the user depressed the toaster handle, the hook member 12 will be downwardly shifted along with the sliding rack until the actuating member 12 contact with the horizontal end 1′-1 of the inverted T shape latch forcing the inverted T shaped latch to pivotally and downwardly fold with respect to the support stand 2 on which the other end of the inverted T shaped latch hinged. On the other hand, the engaging metal holder rotatably coupled to the horizontal free end 1′-1 will be inwardly slide through the guiding slot 5 provided at the relay casing 5. As a result, the engaging metal holder will press the engaging metal 4 approach towards the electromagnet 6. Meanwhile, the switch leaf 7 attached onto the engaging metal 4 will approach towards power leaf 8 supported at the base of the relay casing. After the contacts respectively provided at the switch leaf and the power leaf engaged, the PCB controlled circuit of the toaster will be electrically powered on enabling the electromagnet 6 to attract the engaging metal 4 and guaranteeing the contacts of the power leaf and the switch engaged with a tight position. The heating coils will be continuously charged to toasting the bread.

As shown in FIG. 9, whenever the user release the handle of the toaster, the spring-loaded sliding rack will be automatically popped up thus enabling the actuating member 12 attached onto the sliding rack popped up as well. Since the engaging metal 4 is attracted onto the electromagnet 6, the actuating member 12 will be hitched by the inverted T shaped latch 1. When the toasting time reach the preset time of the electrical timer, the PCB will power off the electromagnet 6 to release the engaging metal 4. The free end engaging metal will be lifted up by the upwardly shifted inverted T shape latch loaded by homing spring 15. As a result, the free end of the engaging magnet 4 will be tilted up to disengage with the electromagnet 6. Therefore, the contacts respectively provided at the switch leaf and the power leaf will be disengaged for guaranteeing the heating coil and PCB circuit electrically powered off.

Figure 11:
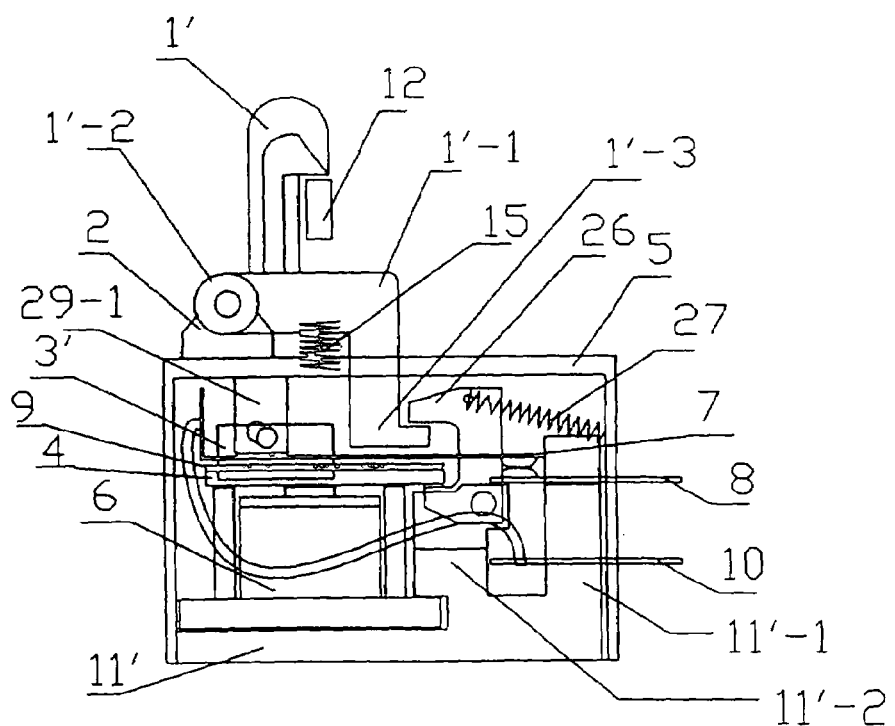
FIG. 11 is a schematic view of the toaster relay switch showing the roaster in use.
Figure 12:
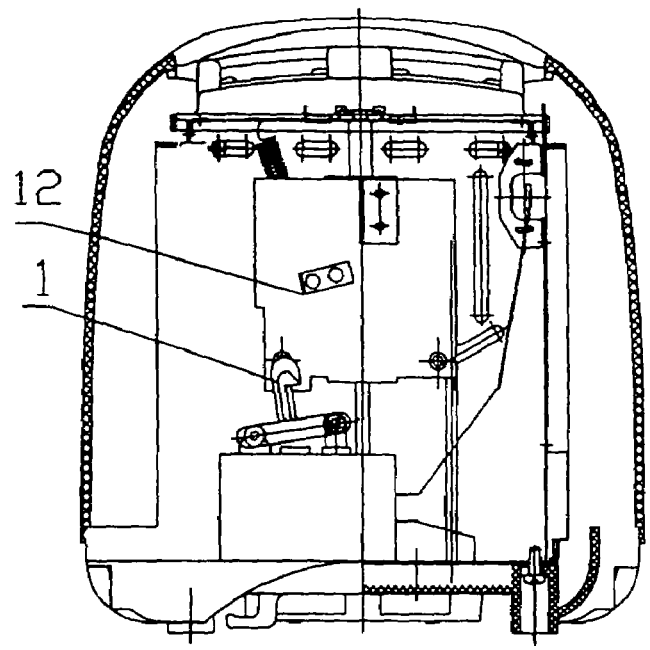
FIG. 12 is a schematic view showing the relay switch installed into a toaster according to the present invention.
Figure 13:
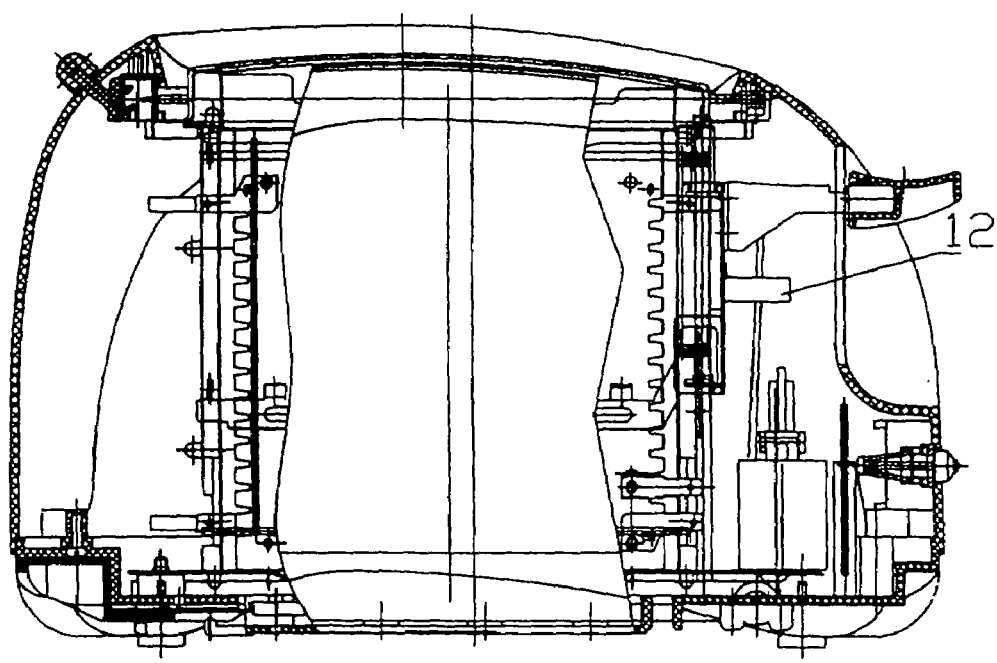
FIG. 13 is a left view of the above FIG. 12.
Figure 14:
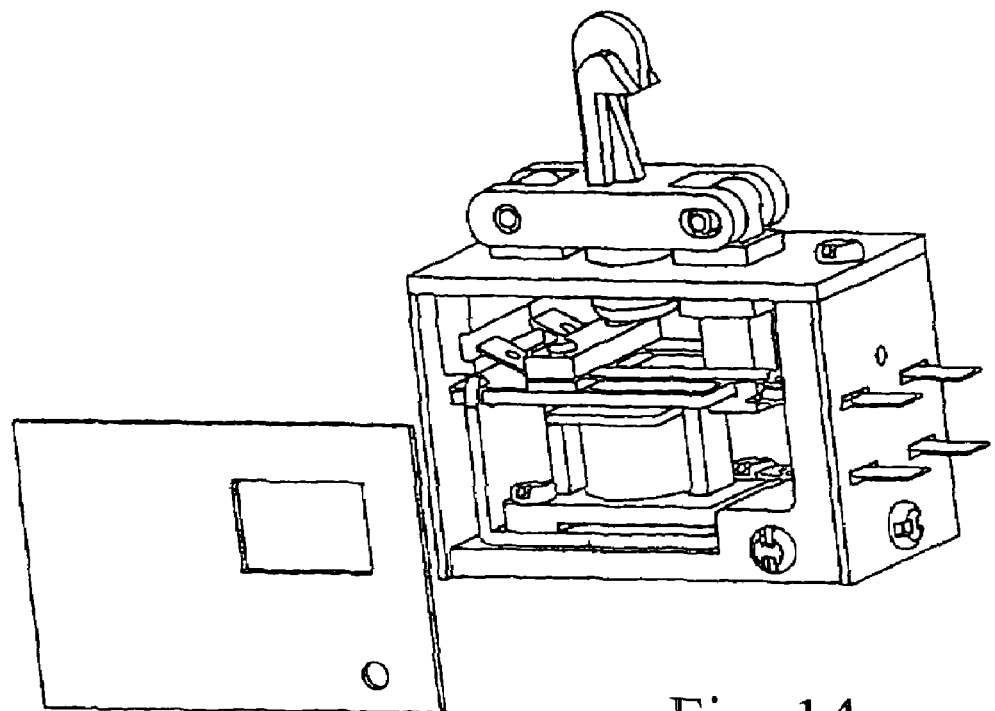
FIG. 14 is a perspective view of the toaster relay switch according to the preferred embodiment of the present invention.
Figure 15:
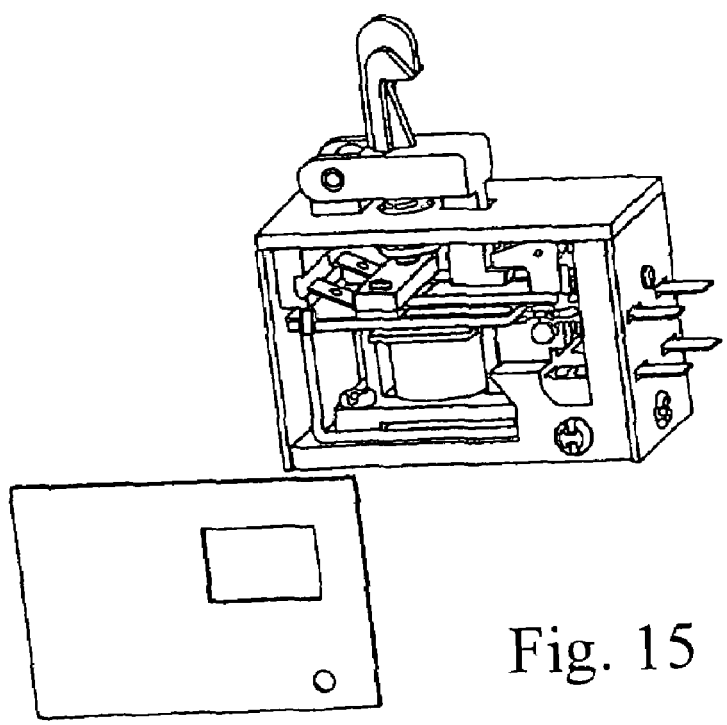
FIG. 15 is a perspective view of the toaster relay switch according to the another embodiment of the present invention.

FIG. 10 and FIG. 11 illustrate a further embodiment of the present. The engaging arrangement comprises a relay casing 5, a support stand 2 provided onto a top portion of the relay casing 5, an inverted T shape latch having a horizontal free end hinged onto the support stand 12, and opposed end integrally combined with engaging metal holder 1-3 and engaging metal post 29-1. Furthermore, the relay switch further comprises a engaging metal unit, having a switch leaf 7, and insulating sheet 9, and a switch leaf support post 3' for supporting the insulating sheet 9 and the switch leaf 7, wherein the insulating sheet is sandwiched between switch leaf 7 and the engaging metal 4. It is noted that the switch leaf support 3' is hinged onto the engaging metal post 29-1 at an upper position of the relay casing 5.

Conclusively, the relay switch of the present invention enables the toasted electrically powered off under the circumstance that the sliding rack and toasting tray are stuck within the toasting housing. That is to say, the relay switch of the present invention could be employed as power-off protection device for safely toasting bread. Moreover, the over structure of the toaster relay are maintained without considerable alternation. And more importantly, the electromagnet, the engaging metal and the power switch are enclosed within a casing, thus preventing crumb, dusts contaminating the relay switch, and electrical arc contact with the electromagnet.

Figure 16:
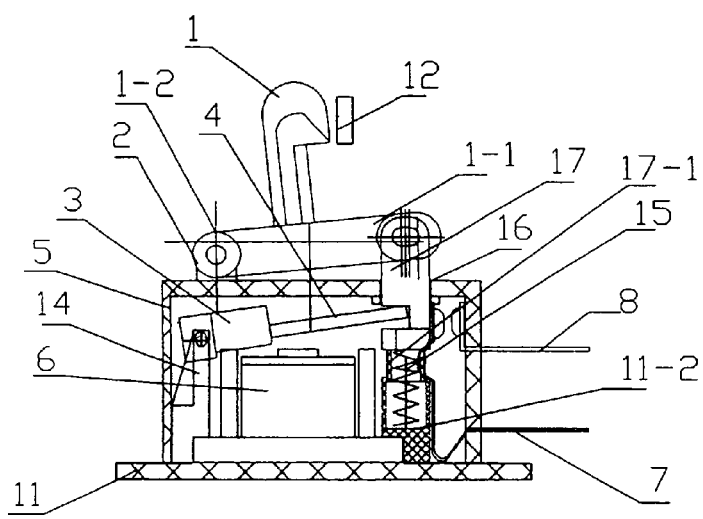
FIG. 16 is a sectional view of the toaster relay switch according to a third preferred embodiment of the present invention.
Figure 18:
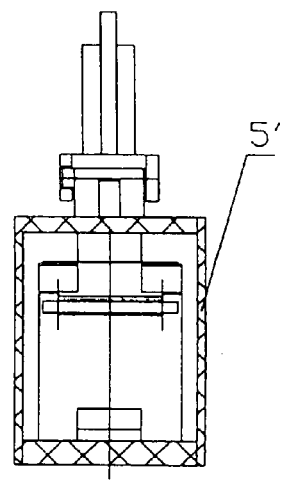
FIG. 18 is a top sectional view of the toaster relay switch according to the above third preferred embodiment of the present invention.
Figure 17:
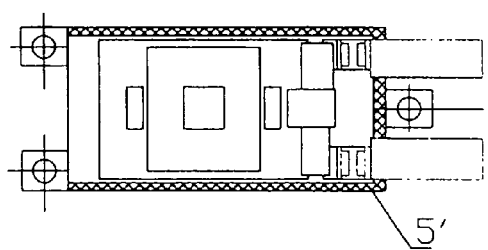
FIG. 17 is a side sectional view of the toaster relay switch according to above third preferred embodiment of the present invention.
Figure 19:
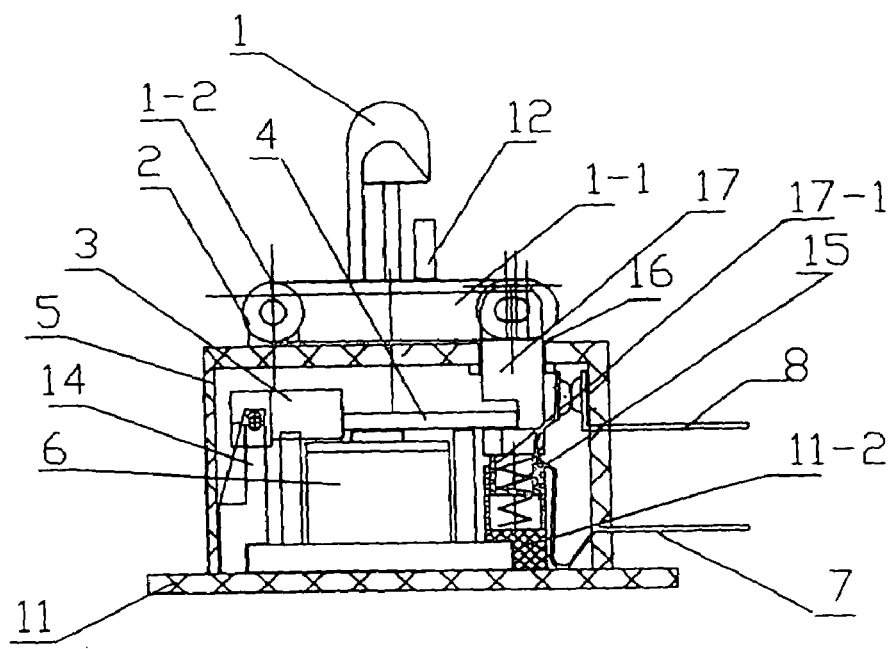
FIG. 19 is a schematic view of the toaster relay switch according to the above third preferred embodiment of the present invention showing the handle bar is disposed at a lower position under a power on circumstance.
Figure 20:
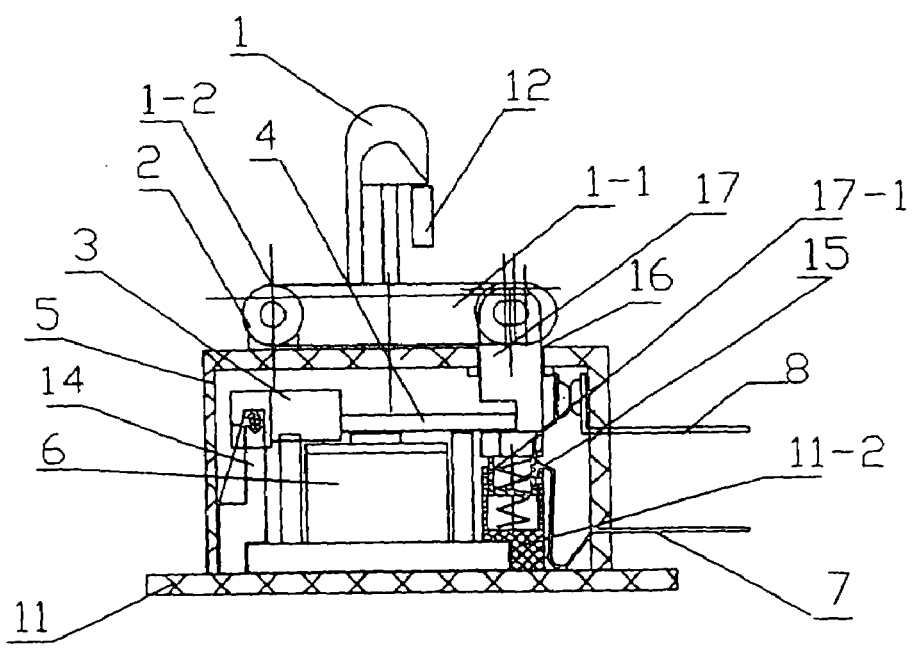
FIG. 20 is a schematic view of the toaster relay switch according to the above third preferred embodiment of the present invention showing the handle bar is disposed at a higher position under a power on circumstance.
Figure 21:
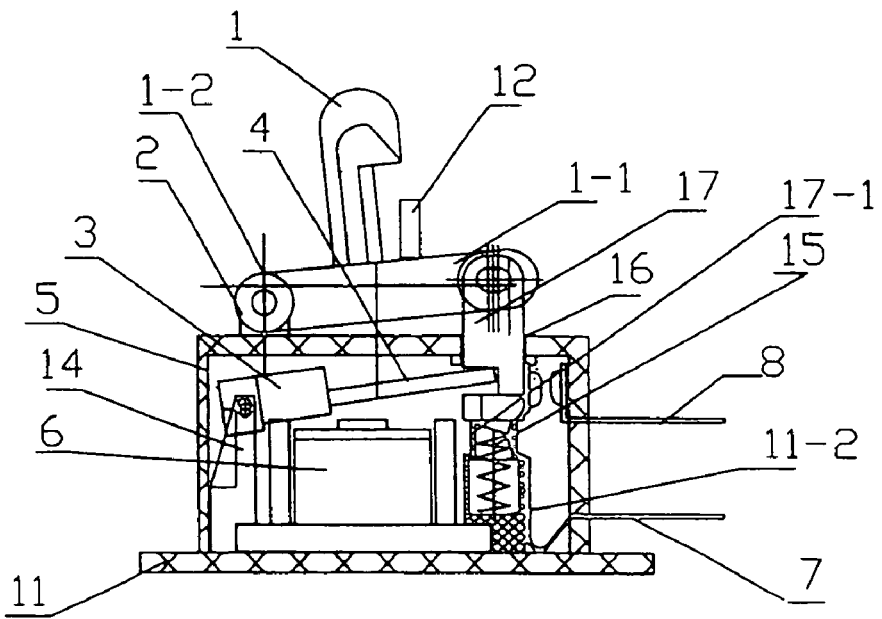
FIG. 21 is a schematic view of the toaster relay switch according to the above third preferred embodiment of the present invention showing the handle bar is disposed at a lower position under a power off circumstance.

Referring to FIGS. 16-21, the toaster relay switch according to a third preferred embodiment of the present invention is illustrated. First of all, a user would insert the bread into the toasting compartment and disposed the bread onto the toasting tray. Afterwards, he or she would depress the handle to lower the sliding rack as well as the toasting tray. At the same time, the hooking member 12 provided at the sliding rack will be lowered until the handle hook 12 engaged with one end of an inverted T shaped latch 1 as shown in FIG. 16.

Therefore, the inverted T shaped latch 1 will be urged to be clockwise rotated with respect to the post 2 on which another end of the inverted T shaped hook is hinged. On the other hand, the engaging metal holder 17 is rotatably coupled to the end 1-2 of the inverted T shaped latch, the clockwise pivoting movement of the inverted T shaped latch 1 would drive the engaging metal holder 17 inwardly sliding along a guiding slot 16 of the casing 5, as a result, the engaging metal holder 17 will press the free end of the engaging metal approaching towards the electromagnet 6. In the meanwhile, the switch leaf 7 provided at the engaging metal 4 will downwardly move as well to approach the power leaf 8. Meanwhile, the pressing pin provided at the side wall of the engaging metal holder 17 will be approaching towards to the power slab contact, which is disposed at the side wall of the switch casing 5. Whenever two contacts respectively provided at the engaging metal holder 17 and the power slab 8 engaged, PCB circuit will be powered to charge the electromagnet 6 so as to attract the engaging metal 4. Therefore, the switch leaf 7 and the power slab 8 will be tightly contacted for ensuring the heating coil electrically charged to toasting the bread received within the toasting housing.

Whenever the user release the handle of the toaster, the spring-loaded sliding rack and the handle hook 12 will be automatically popped up. Since the engaging metal is attracted onto the electromagnet, the handle hook 12 will be hitched by the inverted T shaped latch 1 during the upwardly shifting process as shown in FIG. 16. When toasting time reach the preset time of the electrical timer, the PCB will power off the electromagnet 6 to release the engaging metal 4. The free end engaging metal will be lifted up by the upwardly shifted inverted T shape latch loaded by homing spring 15. The engaging metal holder 17 will move outwardly along the guiding slot 16 so as to tilt up the free end of the engaging metal 4. As a result, the switch leaf 7 will disengage with the power slab 8 for ultimately powering off the PCB circuit and the heating coil. In case of the sliding rack is stuck within the toasting housing, the homing spring 15 provided within the spacing channel 11-2 will bias against the bottom end of the engaging metal holder 17 and subsequently push the inverted T shaped latch 1 counterclockwise rotate. As a result, the engaging metal holder will be pull outwardly via the guiding slot 16 until the inverted T shaped latch stopped by the handle hook 12. At the same time, the pressing pin of the engaging metal holder is disengaged with the switch leaf 7, and subsequently, the switch leaf 7 will disengage with the power slab 8. The PCB circuit and the heating coil will be powered off. That is to say, the toaster will be effectively powered off even the sliding rack is stuck.

According to the third preferred embodiment of the present invention, the switch leaf 7 is L shape defined having an upright leg positioned adjacent to the pressing pin of the engaging metal holder 17, wherein the upright leg has an inwardly bulged portion purposely provided below the pressing pin. On the other hand, the power slab 8 is L shape defined as well having an upright leg correspondingly mated with the L shaped switch leaf 7, wherein contacts respectively defined onto the switch leaf and the power slab are horizontally aligned in latitude. It is noted that the horizontal legs of the switch leaf 7 and power slab 8 are mounted onto the right wall of the switch casing 5.

Figure 22:
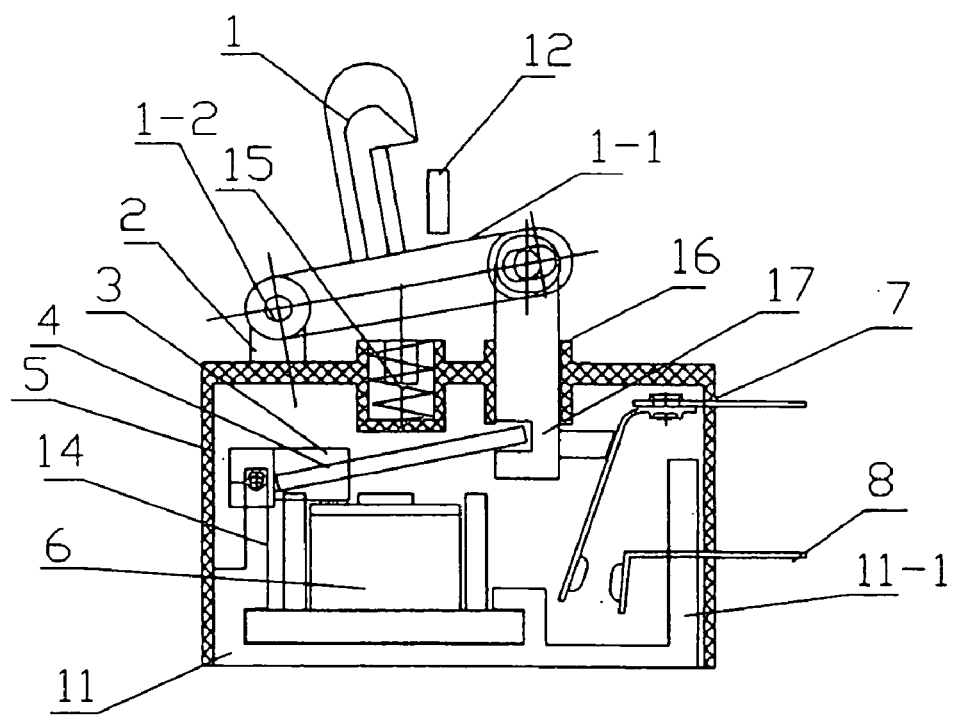
FIG. 22 is a sectional view of the toaster relay switch according to a fourth embodiment of the present invention.

FIG. 22 illustrates a fourth embodiment of the present invention, wherein the switch leaf 7 and the power slab 8 are inverted L shaped, wherein contacts are respectively provided onto vertical legs thereof at an aligned elevation. What is more, the pressing pin is sidewardly projected from the engaging metal holder 17 to releasably bias against the vertical leg of the switch leaf 7, such that the lowered pressing pin will depress the switch leaf rightward deformed thus forcing contacts respectively positioned onto the lower legs of the switch leaf 7 and the power slab engaged. It is noted that the electrical tabs of the switch leaf 7 and the power slab 8 are mounted onto right wall of the switch casing 5 with a spaced parallel status.

Figure 23:
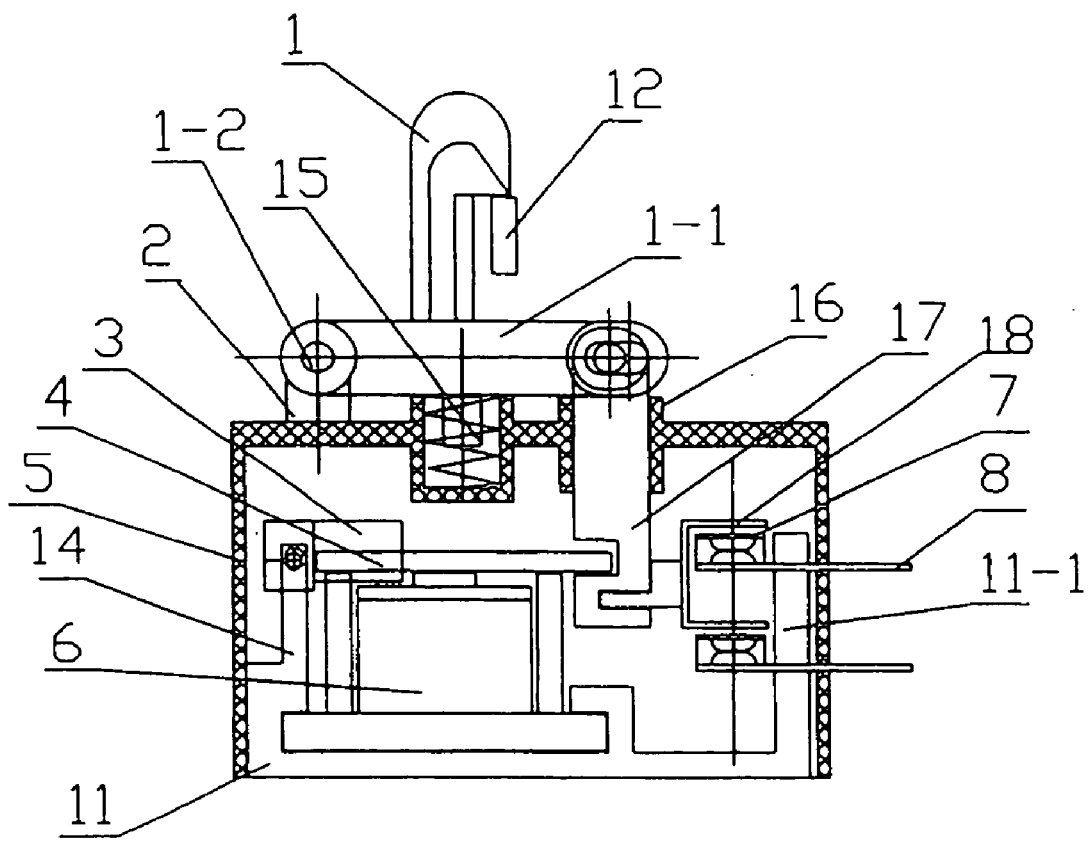
FIG. 23 is a schematic view of the toaster relay switch according to above fourth embodiment of the present invention.
Figure 24:
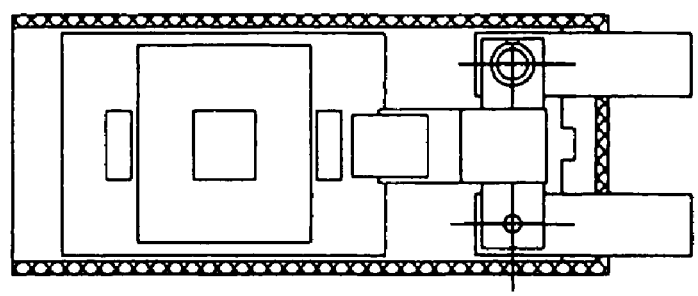
FIG. 24 is a top sectional view of the toaster relay switch according to above fourth embodiment of the present invention.

FIG. 23 and FIG. 24 illustrate a fifth embodiment of the present invention, wherein the switch leaf 7 is L shape defined, and the power slab 8 is straight single line shaped. One end of the L shaped switch leaf 7 is mounted onto the right wall of the switch casing 5, while the other end of the L shaped switch leaf 7 is positioned above the power slab 8 for aligning the contacts respectively defined onto the switch leaf 7 and the power slab 8. It is noted that the pressing pin is defined as a furcated metal element having two ends alternative inserted into the switch leaf 7 and the power slab 8, such that the lowered engaging metal holder 17 will enable two ends of the furcated metal simultaneously engage with the switch leaf 7 and the power slab 8 for completing the circuit.

Figure 25:
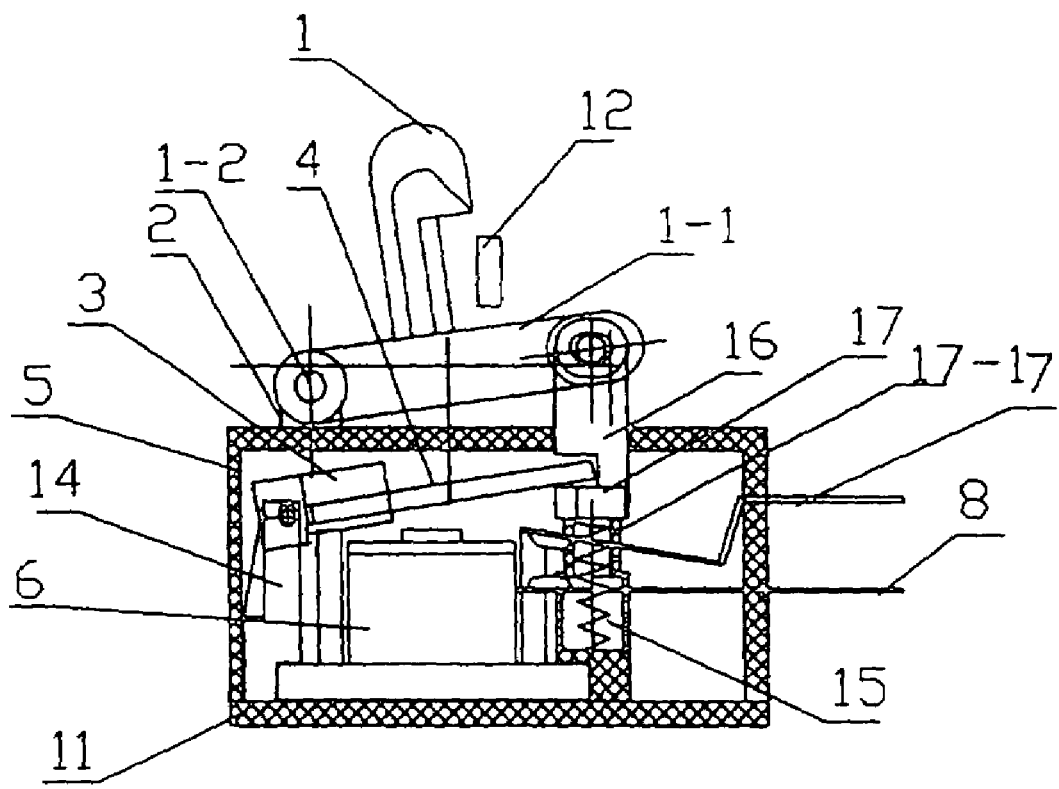
FIG. 25 is a schematic view of the toaster relay switch according to a fifth embodiment of the present invention.
Figure 26:
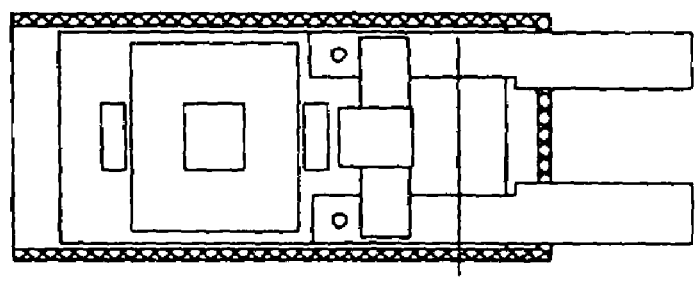
FIG. 26 is a top sectional view of the toaster relay switch according to above fifth embodiment of the present invention.
Figure 27:
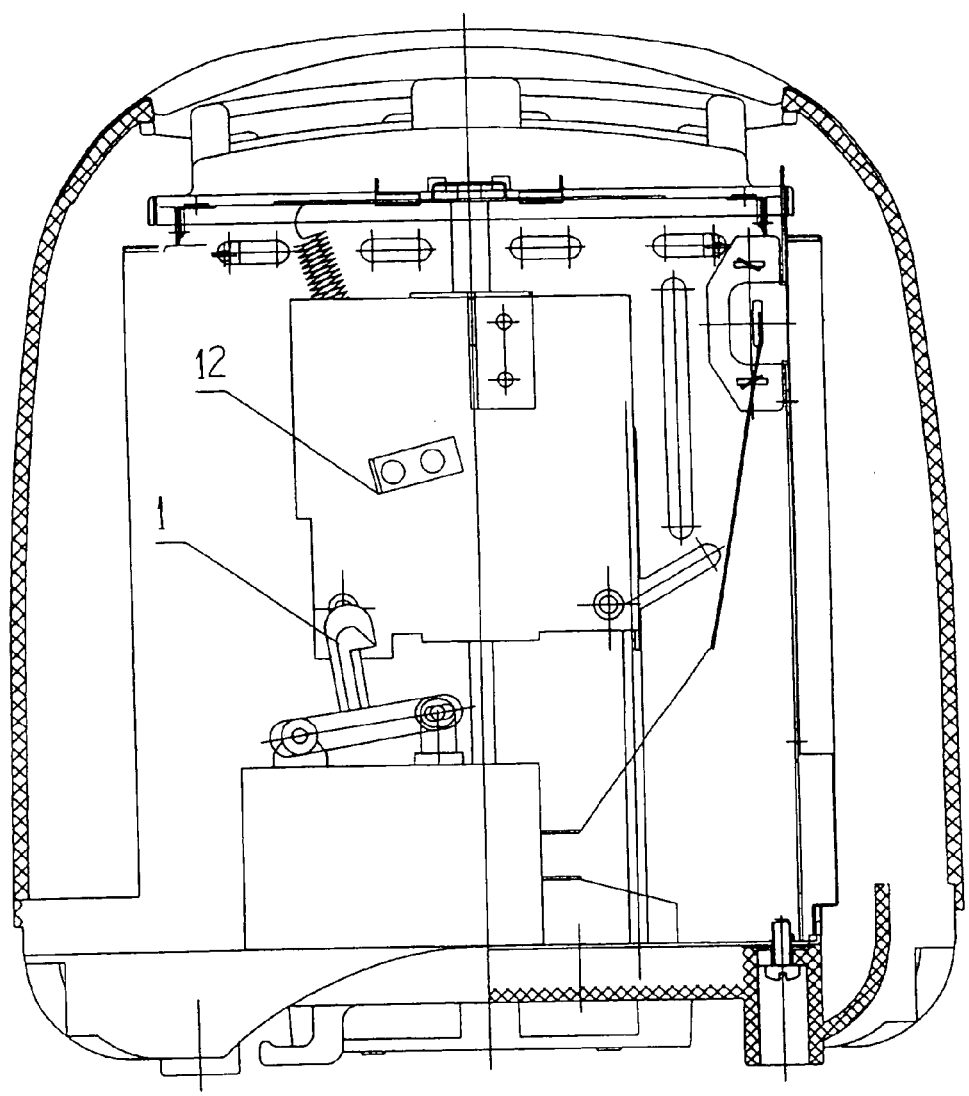
FIG. 27 is a schematic view illustrating the toaster relay switch disposed within the toaster housing.
Figure 28:
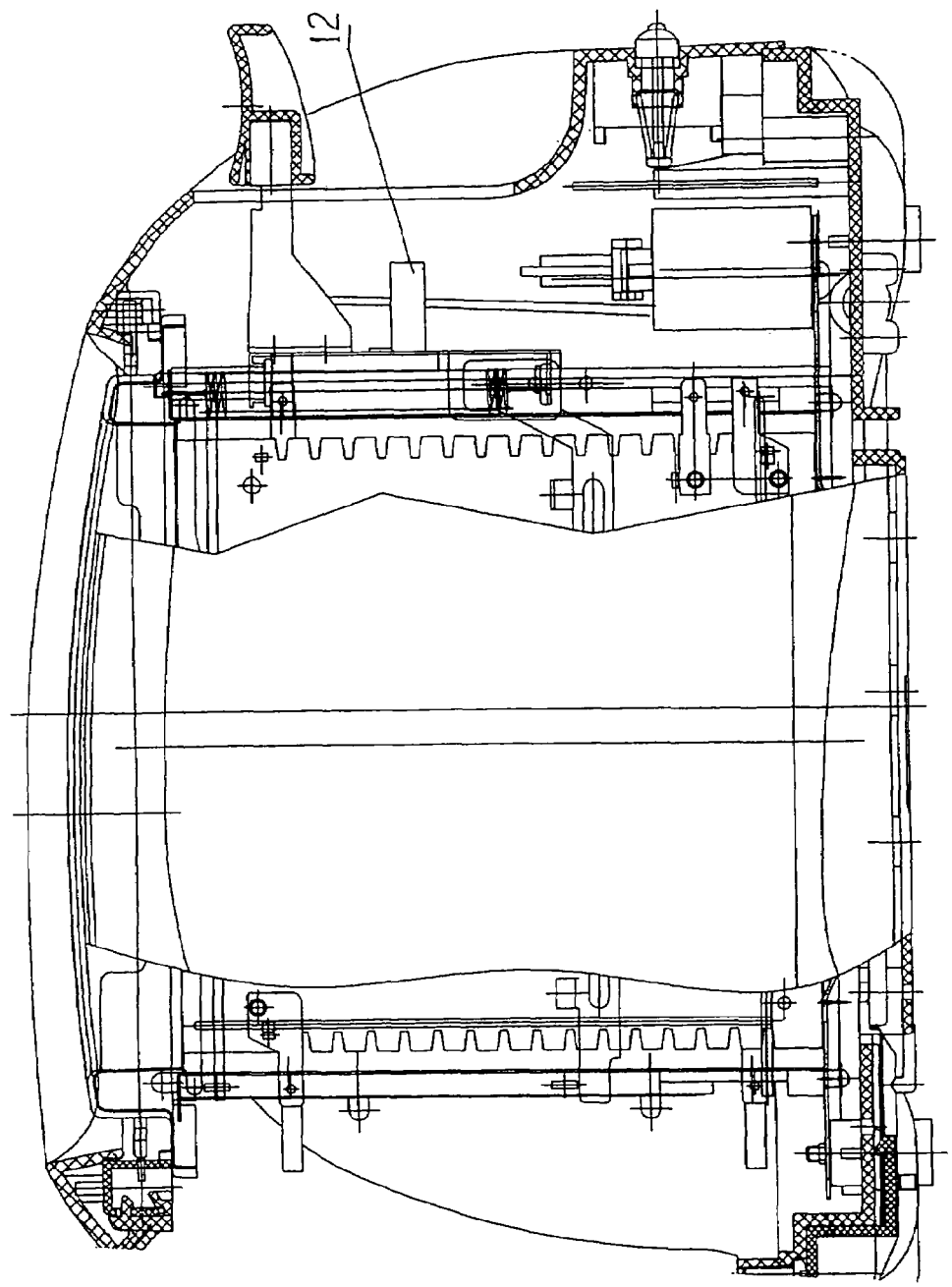
FIG. 28 is a schematic view from another perspective illustrating the toaster relay switch disposed within the toaster housing.

FIG. 25 and FIG. 26 illustrate a sixth embodiment of the present invention, wherein both of the switch leaf 7 and the power slab 8 are straight line shaped parallel with each other in a vertical spaced manner. The contact of the switch leaf 7 is positioned above the contact of the power slab 8, and the switch leaf 7 is disposed beneath the engaging metal holder 17, such that the lowered engaging metal holder 17 will force the switch leaf 7 biasing against the power slab to complete the electrical circuit. It is noted that the switch leaf and the power slab are mounted onto the right wall of the switch casing 5.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure form such principles. Therefore, this invention includes all modifications encompassed within the spirit and scope of the following claims.

What is claimed is:

1. A toaster, comprising:

a toasting housing;

a toasting compartment received within said toasting housing for heating at least a bread;

a PCB circuit provided in said toasting housing for managing a toasting process; and a relay switch arrangement, comprising:

a switch casing having a top stand;

an electromagnet assembly supported within said switch casing, comprising an electromagnet, and an engaging metal having a fixing end supported onto said switch casing and a free end detachably engaged with said electromagnet at a position above said electromagnet;

an actuating member, having a securing end hinged onto said top stand, and an engaging end rotatably coupled to said free end of said engaging metal, wherein said actuating member is shifted between a power-on position and a power-off default position;

a homing spring biasing against said actuating member for maintaining said actuating member in said power-off default position;

a power on/off arrangement, having a power slab securely mounted onto said switch casing and electrically connected to a power source, a switch leaf electrically connected to said electromagnet and moveably supported within said switch casing, and a pair of contacts respectively provided onto said switch leaf and said power slab at corresponding mated position;

wherein in said power-on toasting position, said actuating member and said switch leaf are driven to approach towards said power slab until said pair of contacts engaged to complete said PCB circuit to toast said bread and meanwhile to charge said electromagnet attracting said engaging metal in position, such that said attracted engaging metal will tightly lock said switch leaf being engaged with said power slab during said toasting process; and wherein in said power-off default position, said PCB circuit is powered off enabling said electromagnet to release said engaging metal, said homing spring will upwardly push said actuating member thus driving said engaging metal tilt up so as to disengage said pair of contacts respectively provided onto the engaging leaf and power slab in practice for security purposes.

2. The toaster, as recited in claim 1, wherein said actuating member is inverted T shaped having a fixing end pivotally connected to said top stand, and a free end releasably engaged to said engaging metal.

3. The toaster, as recited in claim 1, wherein said actuating member is inverted L shaped having a fixing end pivotally connected to said top stand, and a free end releasably engaged to said engaging metal.

4. The toaster, as recited in claim 2, wherein said actuating member further comprises an engaging metal holder provided at said free end for supporting said engaging metal in position.

5. The toaster, as recited in claim 2, wherein said actuating member further comprises an engaging metal holder provided at said free end for supporting said engaging metal in position.

6. The toaster, as recited in claim 4, wherein said switch casing further has a guiding slot provided at a top wall of said switch casing for passing through said engaging metal holder such that said actuating member is capable of being inwardly and outwardly moved with respect to said switch casing.

7. The toaster, as recited in claim 5, wherein said switch casing further has a guiding slot provided at a top wall of said switch casing for passing through said engaging metal holder such that said actuating member is capable of being inwardly and outwardly moved with respect to said switch casing.

8. The toaster, as recited in claim 1, wherein said homing spring is provided at a top wall of said switch casing for biasing against a cross bar of said actuating member, such that in said power-off default position, said homing spring is capable of upwardly urging said actuating member so as to tilt up said engaging metal.

9. The toaster, as recited in claim 1, wherein said relay switch arrangement further comprises a engaging metal supporting bracket upwardly from a base wall of said switch casing for pivotally supporting said fixing end of said engaging metal.

10. The toaster, as recited in claim 9, wherein said homing spring is sidewardly positioned to said engaging metal supporting bracket, said homing spring has two ends respectively attached onto said fixing end of said engaging metal and said base wall of said switch casing, such that in said power-off default position, said homing spring pulls said fixing end of said engaging mental counterclockwise rotated so as to tilt up said free end of said engaging metal to disengage with said electromagnet.

11. The toaster, as recited in claim 1, wherein said free end of said actuating member is L shaped having a foot outwardly extended to define a free end terrace, said relay switch arrangement further comprises a C shaped engaging member holder pivotally supported within said switch casing, said C shaped engaging member holder has an upper leg and a lower leg for defining an opening cavity therebetween so as to cover said free end terrace and said free end of said engaging metal.

12. The toaster, as recited in claim 11, wherein said homing spring has two ends respectively attached onto an upper potion of said C shaped engaging member holder and a right wall of said switch casing, such that in said power-off default position, said homing spring will pull said C shaped engaging member holder pivotally shifted with a clockwise manner to tilt up said free end of engaging metal.

13. The toaster, as recited in claim 6, wherein said relay switch arrangement further has a base barrel uprightly extended from a ground of said switch casing for accommodating said home spring, wherein said base barrel is vertically aligned with said guiding slot such that in said power-off default position, depressed said homing spring is capable of upwardly urging said engaging metal holder to tilt up said free end of said engaging metal.

14. The toaster, as recited in claim 6, wherein said relay switch arrangement further has a base barrel uprightly extended from a ground of said switch casing for accommodating said home spring, wherein said base barrel is vertically aligned with said guiding slot such that in said power-off default position, depressed said homing spring is capable of upwardly urging said engaging metal holder to tilt up said free end of said engaging metal.

15. The toaster, as recited in claim 1, wherein said switch leaf and said power slab are straight ling shape and parallel with each other at an elevation spaced position, such that in said power-on position, said lowered actuating member will press said switch leaf engage with said power slab.

16. The toaster, as recited in claim 1, wherein said switch leaf is L shape defined having an upright leg positioned adjacent to said free end of said actuating member, said upright leg has an inwardly bulged portion purposely provided below said actuating member, said power slab is L shape defined as well having an upright arm correspondingly mated with said L shaped switch leaf, wherein contacts respectively defined onto said switch leaf and said power slab are horizontally aligned in latitude.

17. The toaster, as recited in claim 4, wherein said switch leaf is L shape defined having an upright leg positioned adjacent to said free end of said actuating member, said upright leg has an inwardly bulged portion purposely provided below said actuating member, said power slab is L shape defined as well having an upright arm correspondingly mated with said L shaped switch leaf, wherein contacts respectively defined onto said switch leaf and said power slab are horizontally aligned in latitude.

18. The toaster, as recited in claim 1, wherein said switch leaf and said power slab are inverted L shaped, wherein said contacts are respectively provided onto vertical legs thereof at an aligned elevation, said actuating member further comprises a pressing pin sidewardly projected for releasably biasing against said vertical leg of said switch leaf, such that a lowered pressing pin will depress said switch leaf rightward deformed thus forcing contacts respectively positioned onto said switch leaf and said power slab engaged.

19. The toaster, as recited in claim 5, wherein said switch leaf and said power slab are inverted L shaped, wherein said contacts are respectively provided onto vertical legs thereof at an aligned elevation, said actuating member further comprises a pressing pin sidewardly projected for releasably biasing against said vertical leg of said switch leaf, such that a lowered pressing pin will depress said switch leaf rightward deformed thus forcing contacts respectively positioned onto said switch leaf and said power slab engaged.

20. The toaster, as recited in claim 11, wherein said switch leaf and said power stab are inverted L shaped, wherein said contacts are respectively provided onto vertical legs thereof at an aligned elevation, said actuating member further comprises a pressing pin sidewardly projected for releasably biasing against said vertical leg of said switch leaf, such that a lowered pressing pin will depress said switch leaf rightward deformed thus forcing contacts respectively positioned onto said switch leaf and said power slab engaged.

* * * * *